United States Patent
Mifuka et al.

(10) Patent No.: US 10,259,902 B2
(45) Date of Patent: Apr. 16, 2019

(54) RESOL PHENOLIC RESIN FOR FRICTION MATERIAL, METHOD FOR PRODUCING THE SAME, ADHESIVE FOR FRICTION MATERIAL, AND WET FRICTION PLATE

(71) Applicants: SUMITOMO BAKELITE CO., LTD., Tokyo (JP); NSK-WARNER K.K., Tokyo (JP)

(72) Inventors: Hajime Mifuka, Fujieda (JP); Tadashige Hirano, Fukuroi (JP); Kenichi Iso, Fukuroi (JP)

(73) Assignee: SUMITOMO BAKELITE COMPANY LIMITED, Tokyo (JP)

( * ) Notice: Subject to any disclaimer, the term of this patent is extended or adjusted under 35 U.S.C. 154(b) by 198 days.

(21) Appl. No.: 15/087,232

(22) Filed: Mar. 31, 2016

(65) Prior Publication Data

US 2016/0289367 A1 Oct. 6, 2016

(30) Foreign Application Priority Data

Mar. 31, 2015 (JP) ................................. 2015-072169

(51) Int. Cl.
| | | |
|---|---|---|
| B32B 7/00 | (2006.01) | |
| B32B 7/12 | (2006.01) | |
| C08G 8/24 | (2006.01) | |
| B32B 15/00 | (2006.01) | |
| B32B 15/04 | (2006.01) | |
| B32B 27/00 | (2006.01) | |
| B32B 27/06 | (2006.01) | |
| B32B 27/28 | (2006.01) | |
| F16D 69/02 | (2006.01) | |
| F16D 69/04 | (2006.01) | |
| C09J 161/06 | (2006.01) | |

(52) U.S. Cl.
CPC ................ C08G 8/24 (2013.01); B32B 7/00 (2013.01); B32B 7/12 (2013.01); B32B 15/00 (2013.01); B32B 15/04 (2013.01); B32B 27/00 (2013.01); B32B 27/06 (2013.01); B32B 27/28 (2013.01); C09J 161/06 (2013.01); F16D 69/025 (2013.01); F16D 69/04 (2013.01); B32B 2250/02 (2013.01); B32B 2250/26 (2013.01); B32B 2255/06 (2013.01); B32B 2255/26 (2013.01); B32B 2307/50 (2013.01); B32B 2307/538 (2013.01); B32B 2475/00 (2013.01); F16D 2069/0466 (2013.01)

(58) Field of Classification Search
CPC ............................... C08G 8/24; F16D 69/025
See application file for complete search history.

(56) References Cited

U.S. PATENT DOCUMENTS

| | | | | |
|---|---|---|---|---|
| 2,114,121 A | * | 4/1938 | Bender ..................... | C08G 8/30 |
| | | | | 106/221 |
| 3,398,107 A | * | 8/1968 | Rowe, Jr. ............... | C08G 14/04 |
| | | | | 524/313 |
| 3,761,441 A | * | 9/1973 | Brode ................ | C08G 65/4006 |
| | | | | 106/36 |
| 4,013,605 A | * | 3/1977 | Hultzsch .................. | C08G 8/08 |
| | | | | 428/460 |

(Continued)

FOREIGN PATENT DOCUMENTS

| | | |
|---|---|---|
| JP | 34-6740 | 8/1959 |
| JP | 48-016352 B1 | 5/1973 |

(Continued)

OTHER PUBLICATIONS

Machine Translation of JP-2014024881-A, 2018 (Year: 2018).*

*Primary Examiner* — Liam J Heincer
(74) *Attorney, Agent, or Firm* — Westerman, Hattori, Daniels & Adrian, LLP

(57) ABSTRACT

According to the present invention, there is provided a resol phenolic resin for a friction material wherein the resol phenolic resin has a structural unit A represented by Formula (1) and a structural unit B represented by Formula (2):

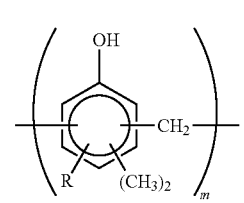

(1)

wherein in Formula (1), m represents an integer of 1 or more; in a case where m is 1, R represents a methylol group; and in a case where m is 2 or more, R's independently represent a hydrogen atom or a methylol group and at least one R is a methylol group; and

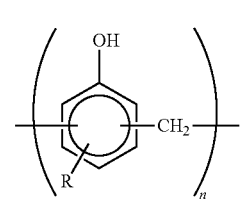

(2)

wherein in Formula (2), n represents an integer of 1 or more; in a case where n is 1, R represents a methylol group; and (Continued)

in a case where n is 2 or more, R's independently represent a hydrogen atom or a methylol group and at least one R is a methylol group.

8 Claims, No Drawings

(56) References Cited

U.S. PATENT DOCUMENTS

| | | | | | |
|---|---|---|---|---|---|
| 4,197,352 | A | * | 4/1980 | Emmett | F16D 69/021 428/409 |
| 4,268,657 | A | * | 5/1981 | Manzara | C08G 8/24 260/998.13 |
| 4,316,827 | A | * | 2/1982 | Pacala | C08G 8/04 523/123 |
| 4,420,571 | A | * | 12/1983 | Blickensderfer | C08G 8/04 523/149 |
| 4,514,462 | A | * | 4/1985 | Brooker | B32B 27/04 442/252 |
| 4,743,634 | A | * | 5/1988 | Royer | F16D 69/026 192/107 M |
| 5,346,799 | A | * | 9/1994 | Jeffries, III | C08G 8/04 430/165 |
| 5,380,800 | A | * | 1/1995 | Bender | C08G 8/08 525/133.5 |
| 5,422,221 | A | * | 6/1995 | Okazaki | C08G 8/12 430/165 |
| 5,516,816 | A | * | 5/1996 | Samuels | F16D 69/026 523/149 |
| 5,645,970 | A | * | 7/1997 | Cheng | C08G 8/04 430/165 |
| 5,721,332 | A | * | 2/1998 | Kano | C08G 8/04 528/129 |
| 5,750,632 | A | * | 5/1998 | Rahman | C08G 8/08 430/192 |
| 5,925,691 | A | * | 7/1999 | Funada | C08G 8/24 523/145 |
| 6,022,502 | A | * | 2/2000 | Lockhart | B29C 37/0078 264/113 |
| 6,056,100 | A | * | 5/2000 | Adamczak | F16D 69/02 192/107 M |
| 2002/0137815 | A1 | * | 9/2002 | Takeuchi | B29C 43/006 523/152 |
| 2002/0137844 | A1 | * | 9/2002 | Narisawa | C08L 61/06 525/100 |
| 2004/0006192 | A1 | * | 1/2004 | Aiba | C08G 8/10 528/129 |
| 2004/0029999 | A1 | * | 2/2004 | Muller | C08L 61/06 523/145 |
| 2004/0121145 | A1 | * | 6/2004 | Kawabata | D21H 17/68 428/331 |
| 2006/0094853 | A1 | * | 5/2006 | Arbuckle | C08G 8/04 528/128 |
| 2006/0223907 | A1 | * | 10/2006 | Mori | C08G 8/28 523/149 |
| 2014/0017612 | A1 | * | 1/2014 | Reddy | C08G 63/00 430/281.1 |
| 2014/0100308 | A1 | * | 4/2014 | Tseng | C08G 8/04 524/14 |
| 2015/0192182 | A1 | * | 7/2015 | Yamamoto | F16D 69/026 523/157 |

FOREIGN PATENT DOCUMENTS

| | | |
|---|---|---|
| JP | 9-118730 A | 5/1997 |
| JP | 2003-183341 A | 7/2003 |
| JP | 2006-83892 A | 3/2006 |
| JP | 2014-24881 A | 2/2014 |
| JP | 2014024881 A * | 2/2014 |

* cited by examiner

RESOL PHENOLIC RESIN FOR FRICTION MATERIAL, METHOD FOR PRODUCING THE SAME, ADHESIVE FOR FRICTION MATERIAL, AND WET FRICTION PLATE

BACKGROUND

Technical Field

The present invention relates to a resol phenolic resin for a friction material, a method for producing the same, an adhesive for a friction material, and a wet friction plate.

Related Art

A resol phenolic resin is a resin material which is excellent in mechanical characteristics, electrical characteristics, and adhesiveness. For this reason, resol phenolic resins are widely used as a binder resin which is used when producing a friction material such as a clutch or a brake.

Among these, regarding a resol phenolic resin which is used as the binder resin when producing a friction material which is used in an automatic transmission of an automatic transmission vehicle or the like, that is, a wet friction plate, curing characteristics, such as adhesive strength, needs to be improved in order to improve friction characteristics provided in the above-described wet friction plate, and various examinations have been performed thereon in the related art.

Examples of a technique focusing on the improvement of curing characteristics of a resol phenolic resin include the following.

In Japanese Unexamined Patent Publication No. 2014-24881, there is disclosed an adhesive composition containing a resol phenolic resin (A) of which the curing time is short and which has excellent adhesive strength; a polyvinyl butyral resin (B); a polyvalent metal salt (C); and a metal salt of nitrous acid or an ester of nitrous acid (D).

In Japanese Unexamined Patent Publication No. 2006-83892, there is disclosed an adhesive for a wet friction plate containing nitrate or nitric acid and a resol phenolic resin which exhibits excellent adhesive strength.

SUMMARY

As is described in the section of the above-described related art, various examinations have been performed to improve curing characteristics of the resol phenolic resins in the related art. However, in recent years, a resol phenolic resin which can achieve excellent adhesive strength within a short curing time is being demanded from the viewpoint of improving the efficiency of producing a friction material.

Here, the present invention provides a resol phenolic resin for a friction material which can achieve high adhesive strength within a short adhering time, a method for producing the same, an adhesive for a friction material which contains the resol phenolic resin for a friction material, and a wet friction plate.

According to the present invention, there is provided a resol phenolic resin for a friction material used in an adhesive which is used for adhering the friction material to a metal base material, wherein the resol phenolic resin for a friction material has a structural unit A which is modified by dimethylphenols and is represented by the following Formula (1) and a structural unit B which is represented by the following Formula (2), in a molecular structure.

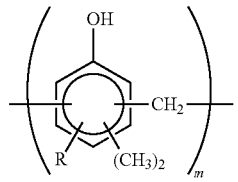

In Formula (1), m represents an integer of 1 or more; in a case where m is 1, R represents a methylol group; in a case where m is 2 or more, R's independently represent a hydrogen atom or a methylol group and at least one R is a methylol group.

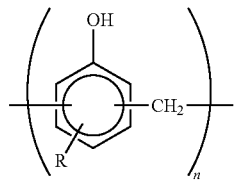

In Formula (2), n represents an integer of 1 or more; in a case where n is 1, R represents a methylol group; in a case where n is 2 or more, R's independently represent a hydrogen atom or a methylol group and at least one R is a methylol group.

Furthermore, according to the present invention, in another embodiment, there is provided a method for producing a resol phenolic resin for a friction material used in an adhesive for adhering the friction material to a metal base material, the method includes obtaining a first reaction product by reacting aldehydes with phenols excluding dimethylphenols in the presence of a basic catalyst, and obtaining a resol phenolic resin by reacting the first reaction product with the dimethylphenols in the presence of the basic catalyst.

Furthermore, according to the present invention, there is provided an adhesive for a friction material including the above-described resol phenolic resin for a friction material, and one or more elastomers selected from the group consisting of a polyvinyl butyral resin, nitrile butadiene rubber, styrene butadiene rubber, and an epoxy resin.

Furthermore, according to the present invention, there is provided a wet friction plate comprising a friction material, a metal base material, and an adhesive interposed between the friction material and the metal base material.

According to the present invention, it is possible to provide a resol phenolic resin for a friction material which can achieve high adhesive strength within a short adhering time, a method for producing the same, an adhesive for a friction material which contains the resol phenolic resin for a friction material, and a wet friction plate.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

<Resol Phenolic Resin for Friction Material>

A resol phenolic resin for a friction material (hereinafter, also referred to as a resol phenolic resin) according to the present embodiment is used in an adhesive which is used for adhering a friction material to a metal base material. The resol phenolic resin has a structural unit A which is modified by dimethylphenols and is represented by the following Formula (1) and a structural unit B which is represented by the following Formula (2), in a molecular structure. In other words, the resol phenolic resin of the present invention has the structural unit A having a dimethylphenol skeleton in a general structure of the resol phenolic resin consisting of the structural unit B. Since this resol phenolic resin contains the structural unit A, which has two methyl groups as electron-donating groups, in the structural unit in this manner, this resol phenolic resin is excellent in reactivity compared to the adhesives in the related art which are used for making a friction material and a metal base material adhere to each other. In addition, according to this resol phenolic resin, since this resol phenolic resin has the structural unit A, which has two methyl groups as electron-donating groups, in the structural unit as described above, it is also possible to improve the cross-linking density when the resin is thermally cured. Accordingly, according to this resol phenolic resin, it is possible to realize high adhesive strength within a short adhering time compared to the conventional adhesives.

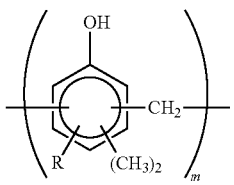
(1)

In Formula (1), m represents an integer of 1 or more; in a case where m is 1, R represents a methylol group; in a case where m is 2 or more, R's independently represent a hydrogen atom or a methylol group and at least one R is a methylol group.

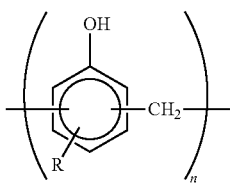
(2)

In Formula (2), n represents an integer of 1 or more; in a case where n is 1, R represents a methylol group; in a case where n is 2 or more, R's independently represent a hydrogen atom or a methylol group and at least one R is a methylol group.

The above-described resol phenolic resin is obtained through reaction between aldehydes and phenols including dimethylphenols.

The resol phenolic resin of the present invention contains the structural unit A having a dimethylphenol skeleton in addition to the structural unit B which is a general structure provided in a resol phenolic resin. Specific examples of dimethylphenols from which the structural unit A is derived include 2,3-dimethylphenol, 2,4-dimethylphenol, 2,5-dimethylphenol, 2,6-dimethylphenol, 3,4-dimethylphenol, and 3,5-dimethylphenol. Among these, 3,5-dimethylphenol is preferable from the viewpoint of reactivity of the obtained resin, structural stability during curing of the resin, or the like due to the bulkiness of a methyl group which is a substituent of 3,5-dimethylphenol. In this case, the resol phenolic resin to be obtained has a structural unit C which is modified by 3,5-dimethylphenol and is represented by the following Formula (3).

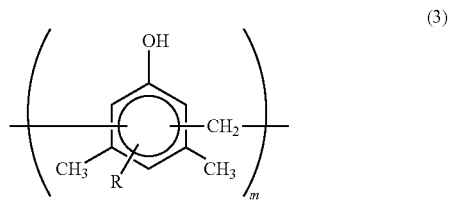
(3)

In Formula (3), m represents an integer of 1 or more; in a case where m is 1, R represents a methylol group; in a case where m is 2 or more, R's independently represent a hydrogen atom or a methylol group and at least one R is a methylol group.

In the preferred embodiment, the resol phenolic resin of the present invention is composed of the structural unit A and the structural unit B.

Specific examples of phenols from which the structural unit B is derived include phenol and cresols such as o-cresol, m-cresol, and p-cresol.

In addition, the above-described resol phenolic resin may have a structural unit derived from other phenols in addition to the structural unit A derived from dimethylphenols represented by the above-described Formula (1) and the structural unit B derived from phenols represented by Formula (2). Specific examples of the phenols include ethylphenols such as o-ethylphenol, m-ethylphenol, and p-ethylphenol; butylphenols such as isopropylphenol, butylphenol, and p-tert-butylphenol; alkylphenols such as p-tert-amylphenol, p-octylphenol, p-nonylphenol, and p-cumylphenol; halogenated phenols such as fluorophenol, chlorophenol, bromophenol, and iodophenol; monovalent substituted phenols such as p-phenylphenol, aminophenol, nitrophenol, dinitrophenol, and trinitrophenol; monovalent phenols such as 1-naphthol and 2-naphthol; polyvalent phenols such as resorcin, alkylresorcin, pyrogallol, catechol, alkyl catechol, hydroquinone, alkyl hydroquinone, phloroglucin, bisphenol A, bisphenol F, bisphenol S, and dihydroxynaphthalene. These may be used alone or two or more kinds thereof may be used in combination. Among these, any one or more kinds selected from the group consisting of phenol, cresols, and bisphenol A are preferable from the viewpoint of improving the mechanical strength of a cured product. In addition, it is preferable that phenols are soluble in an organic solvent to be described below from the viewpoint of handleability in a step of producing a resin.

From the viewpoint of balance among reactivity during heating, the mechanical strength of a cured product, production costs of a cured product, and the like, when the rate of the structural unit A represented by the above-described Formula (1) in all structural units having a phenolic hydroxyl group contained in this resol phenolic resin is defined as a dimethylphenol modification rate, the dimethylphenol modification rate of this resol phenolic resin is preferably greater than or equal to 3% and less than or equal to 50%, more preferably greater than or equal to 3% and less than or equal to 40%, and most preferably greater than or equal to 3% and less than or equal to 35%. By setting the dimethylphenol modification rate to be greater than or equal to the above-described lower limit value, it is possible to obtain a sufficient effect of improving the curing property of the resol phenolic resin. In addition, by setting the dimethylphenol modification rate to be less than or equal to the above-described upper limit value, it is possible to reduce the amount of expensive dimethylphenols used in the production of the resol phenolic resin, and therefore, it is possible to obtain a resol phenolic resin which is excellent in practical use from the viewpoint of costs.

Here, this resol phenolic resin is preferably in a liquid form from the viewpoint of handleability. Hereinafter, an example of the case where the resol phenolic resin is in a liquid form will be described.

The resol phenolic resin is obtained by reacting aldehydes with phenols including dimethylphenols in the presence of a basic catalyst. Specific examples of the phenols which are raw materials for producing this resol phenolic resin are as described above.

Hereafter, a method for producing the resol phenolic resin will be described.

A method for producing the resol phenolic resin includes a step of reacting aldehydes with phenols, which include dimethylphenols, in the presence of a basic catalyst. Specifically, the method for producing the resol phenolic resin includes: a first step of obtaining a first reaction product by reacting aldehydes with phenols excluding dimethylphenols in the presence of the basic catalyst; and a second step of obtaining a resol phenolic resin by reacting the first reaction product with the dimethylphenols in the presence of the basic catalyst.

The phenols used in the above-described first step are phenols from which the structural unit B is derived and other phenols, as described above.

The dimethylphenols used in the above-described second step are dimethylphenols from which the structural unit A is derived, as described above.

Specific examples of aldehydes as raw materials for producing the resol phenolic resin include: formaldehyde, paraformaldehyde, trioxane, acetaldehyde, propionaldehyde, polyoxymethylene, chloral, hexamethylenetetramine, furfural, glyoxal, n-butylaldehyde, caproaldehyde, allyl aldehyde, benzaldehyde, crotonaldehyde, acrolein, tetra oxymethylene, phenylacetaldehyde, o-tolualdehyde, and salicylaldehyde. These may be used alone or two or more kinds thereof may be used in combination. In addition, it is possible to use precursors of these aldehydes or solutions of these aldehydes. Among these, a formaldehyde aqueous solution is preferably used from the viewpoint of production costs.

Specific examples of the basic catalyst used for producing the resol phenolic resin include: hydroxides of alkali metals or alkaline-earth metals such as sodium hydroxide, potassium hydroxide, and calcium hydroxide; carbonates such as sodium carbonate, calcium carbonate; oxides such as lime; sulfites such as sodium sulfite; phosphates such as sodium phosphate; amines such as ammonia, trimethylamine, triethylamine, monoethanolamine, diethanolamine, triethanolamine, hexamethylenetetramine, and pyridine.

The amount of dimethylphenols used in the above-described second step is, with respect to 100 parts by weight of phenols excluding the dimethylphenols, preferably greater than or equal to 5 parts by weight and less than or equal to 100 parts by weight and more preferably greater than or equal to 5 parts by weight and less than or equal to 50 parts by weight, from the viewpoint of improving reactivity and improved curing property of a resol phenolic resin to be obtained. By setting the amount of dimethylphenols to be greater than or equal to the above-described lower limit value, it is possible to obtain a sufficient effect of improving curing property of a resol phenolic resin to be obtained. In addition, by setting the amount of dimethylphenols to be less than or equal to the above-described upper limit value, it is possible to reduce the amount of expensive dimethylphenols used, and therefore, it is possible to obtain a resol phenolic resin which is excellent in practical use from the viewpoint of costs.

In addition, provided (P) indicates a total amount of phenols including dimethylphenols and (F) indicates an amount of aldehydes used in the above-described production method, the value of (F/P), which is expressed in terms of molar ratio is preferably greater than or equal to 0.8 and less than or equal to 3 and more preferably greater than or equal to 1 and less than or equal to 2.5, from the viewpoint of improving the adhesive strength of obtained resol phenolic resin. By setting the value of (F/P) to be greater than or equal to the above-described lower limit value, it is possible to achieve sufficient cross-linking density when thermally curing the resol phenolic resin, and therefore, it is possible to further improve the adhesive strength of the resol phenolic resin. In addition, by setting the value of (F/P) to be less than or equal to the above-described upper limit value, the cross-linking density is prevented from excessively increasing to such extent that the adhesiveness of the resin is damaged. As a result, it is possible to obtain a resol phenolic resin with excellent adhesive strength.

In addition, the amount of basic catalyst used in this production method is, with respect to 1 mole of phenols including dimethylphenols, preferably greater than or equal to 0.01 moles and less than or equal to 1 mole and more preferably greater than or equal to 0.05 moles and less than or equal to 0.5 moles, from the viewpoint of reducing the amount of unreacted phenols and unreacted aldehydes. By setting the amount of basic catalyst to be greater than or equal to the above-described lower limit value, it is possible to shorten the time required for synthesis reaction of the resol phenolic resin. Therefore, it is possible to realize an excellent resol phenolic resin from the viewpoint of productivity. In addition, by setting the amount of basic catalyst to be less than or equal to the above-described upper limit value, the reaction rate during a synthesis reaction of the resol phenolic resin can be prevented from rapidly increasing. Therefore, it is possible to obtain an excellent resol phenolic resin from the viewpoint of stable quality.

In addition, the content of unreacted phenols (free phenol) contained in the resol phenolic resin is, with respect to the total amount of the resol phenolic resin, preferably less than 5 mass % and more preferably less than 3 mass %. By setting the unreacted phenols to be within the above-described range, it is possible to suppress volatilization of phenol components, and therefore, it is possible to provide a favorable working environment. In addition, in a case where the content of the unreacted phenols (free phenol) is less than or equal to the above-described upper limit value, it is unnecessary to remove monomers requiring complicated processing, when producing the resol phenolic resin.

As the reaction solvent used in the above-described first step and the second step, water is generally used, but an organic solvent may be used. Specific examples of the organic solvent include alcohols, ketones, and aromatics. Specific examples of the alcohols include methanol, ethanol, propyl alcohol, ethylene glycol, diethylene glycol, triethylene glycol, and glycerin. In addition, specific examples of ketones include acetone and methyl ethyl ketone. Specific examples of aromatics include toluene and xylene.

<Adhesive for Friction Material>

The adhesive for a friction material according to the present embodiment contains the above-described resol phenolic resin for a friction material; and one or more elastomers selected from the group consisting of a polyvinyl butyral resin, nitrile butadiene rubber, styrene butadiene rubber, and an epoxy resin. By using these materials, it is possible to achieve an adhesive for a friction material with which it is possible to obtain an excellent cured product from the viewpoint of mechanical characteristics such as flexibility and toughness.

The content of the above-described elastomer is, with respect to the total amount of the adhesive for a friction material, preferably greater than or equal to 1 wt % and less than or equal to 20 wt % and more preferably greater than or equal to 2 wt % and less than or equal to 10 wt %, from the viewpoint of improving the mechanical characteristics of a cured product. By setting the content of the above-described elastomer to be greater than or equal to the above-described lower limit value, it is possible to improve flexibility of the adhesive. Therefore, as a result, it is possible to obtain an adhesive having excellent adhesive strength. In addition, by setting the content of the above-described elastomer to be less than or equal to the above-described upper limit value, it is possible to reduce the content of elastomer having inferior heat resistance. Therefore, as a result, it is possible to achieve an excellent adhesive in terms of heat resistance.

In addition, the adhesive for a friction material may further contain resorcins. By using such materials, it is possible to further improve the curing rate of the adhesive for a friction material. Specific examples of the resorcins include resorcin; methylresorcins such as 2-methyl resorcin, 5-methyl resorcin, and 2,5-dimethyl resorcin; 4-ethyl resorcin; 4-chloro resorcin; 2-nitro-resorcin; 4-bromoresorcin; and 4-n-hexyl resorcin. These may be used alone or two or more kinds may be used in combination. Among these, it is preferable to use at least one selected from the group consisting of resorcin, and methyl resorcins from the viewpoint of production costs of the adhesive and moldability of the adhesive.

The content of the above-described resorcins is, with respect to the total amount of the adhesive for a friction material, preferably greater than or equal to 0.01 wt % and less than or equal to 10 wt % and more preferably greater than or equal to 0.02 wt % and less than or equal to 5 wt %, from the viewpoint of improving curing characteristics of a cured product. By setting the content of the above-described resorcins to be greater than or equal to the above-described lower limit value, it is possible to improve curing property of the adhesive. Therefore, as a result, it is possible to obtain an excellent adhesive from the viewpoint of curing characteristics. In addition, by setting the content of the above-described resorcins to be less than or equal to the above-described upper limit value, it is possible to suppress a decrease in cross-linking density. Therefore, it is possible to achieve an excellent adhesive from the viewpoint of curing characteristics and adhesive strength.

In addition, the adhesive for a friction material may be diluted with an organic solvent from the viewpoint of improving the handleability. Specific examples of the organic solvent include alcoholic organic solvents such as methanol, ethanol, isopropanol, and butanol; ketone-based organic solvents such as acetone, methyl ethyl ketone, and methyl isobutyl ketone; aromatic hydrocarbon solvents such as toluene and ethyl benzene; and a mixture thereof.

<Wet Friction Plate>

A wet friction plate according to the present embodiment includes a friction material, a metal base material, and an adhesive interposed between the friction material and the metal base material. In other words, the wet friction plate is obtained by adhering the friction material to the metal base material. By adopting the adhesive having superior heat resistance and curing property, the wet friction plate excellent in adhesiveness between the friction material and the metal base material (steel sheet or the like) can be achieved.

The friction material according to the present embodiment can be produced by the following method. However, the method for producing a friction material according to the present embodiment is not limited to the following example.

First, a binding material and a powdery raw material, which contains a fiber base material and a filler, are measured so as to make a predetermined composition ratio, and are mixed with each other using a mixer. Specific examples of the mixer include a general mixer such as an EIRICH mixer. Next, a predetermined amount of the raw material composition obtained by the mixing is separated, and preliminary molding is performed thereon in order to make a block body. Thereafter, a molded body is produced by placing the obtained preliminarily molded body in a mold which has been heated to 150° C. and pressurizing the preliminarily molded body for about 3 minutes to 7 minutes. Next, the produced molded body is cured through heat processing which is performed, for example, for about 1 hour at a temperature of higher than or equal to 200° C., thereby obtaining the friction material according to the present embodiment.

Specific examples of the above-described fiber base material include inorganic fibers such as steel fibers, copper fibers, glass fibers, ceramic fibers, and potassium titanate fibers; and organic fibers such as aramid fibers and cellulose fibers. These may be used alone or two or more kinds thereof may be used in combination. Among these, it is preferable to use organic fibers such as aramid fibers.

Specific examples of the above-described filler include inorganic fillers such as diatomaceous earth, calcium carbonate, calcium hydroxide, barium sulfate, mica, abrasive, kaolin, and talc; organic fillers such as cashew dust and rubber dust; and lubricating materials such as graphite, antimony trisulfide, molybdenum disulfide, and secondary zinc disulfide. These may be used alone or two or more kinds thereof may be used in combination. Among these, it is preferable to use inorganic fillers.

Here, the wet friction plate according to the present embodiment is used in order to manufacture a friction component such as a clutch or a brake.

The embodiment of the present invention has been described. However, the embodiment of the present invention is an example of the present invention, and it is possible to employ various configurations other than the above-described configurations.

EXAMPLE

Hereinafter, the present invention will be described using Examples and Comparative Example, but is not limited thereto.

Example 1

In a reaction device provided with a mixing device, a reflux condenser, and a thermometer, 100 parts by weight of phenol, 117 parts by weight (F/P molar ratio=1.2) of 37% formalin aqueous solution, and 4 parts by weight of 30% ammonia aqueous solution were mixed and allowed to react for 40 minutes under reflux. Thereafter, 20 parts by weight of methanol and 15 parts by weight of 3,5-dimethylphenol were added when the temperature of the system reached 70° C. while being dehydrated under a reduced pressure condition of 91 kPa, and were allowed to react for 3 hours at 80° C. After adding 7 parts by weight of methanol and 15 parts by weight of toluene, a resol phenolic resin was obtained. The obtained resol phenolic resin had a structural unit derived from 3,5-dimethylphenol and a structural unit derived from phenol, in a molecular structure.

391 parts by weight of an adhesive for a friction material was obtained by mixing the obtained resol phenolic resin in a solution which was obtained by dissolving 29 parts by weight of polyvinyl butyral resin in 78 parts by weight of methanol and 6 parts by weight of toluene.

Example 2

The same method as that in Example 1 was employed except that an adhesive for a friction material was obtained by adding 3 parts by weight of resorcin to the adhesive for a friction material of Example 1.

Example 3

A resol phenolic resin and an adhesive for a friction material were produced using the same method as in Example 1 except that 5 parts by weight of 3,5-dimethylphenol was used. The obtained resol phenolic resin had a structural unit derived from 3,5-dimethylphenol and a structural unit derived from phenol, in a molecular structure.

Example 4

A resol phenolic resin and an adhesive for a friction material were produced using the same method as in Example 1 except that 50 parts by weight of 3,5-dimethylphenol was used. The obtained resol phenolic resin had a structural unit derived from 3,5-dimethylphenol and a structural unit derived from phenol, in a molecular structure.

Comparative Example 1

A resol phenolic resin and an adhesive for a friction material were produced using the same method as in Example 1 except that 3,5-dimethylphenol was not used. The obtained resol phenolic resin had a structural unit derived from phenol, but did not have a structural unit derived from 3,5-dimethylphenol, in a molecular structure.

The adhesives for a friction material in Examples and Comparative Example were evaluated for the following characteristics. It was confirmed that almost all of the 3,5-dimethylphenols which was used for the production of the resol phenolic resins in Examples were reacted. For this reason, the dimethylphenol modification rate was calculated through a method to be described below.

Adhesive strength: After coating two sheets of pickled steel sheets with an adhesive for a friction material in Examples or Comparative Example, drying processing was performed for 15 minutes at 80° C. Next, a test piece was produced by performing thermo-compression bonding for 30 minutes at 160° C. under a pressure condition of 5 MPa. A tensile shear test was conducted using the obtained test piece according to JIS K6850, and the adhesive strength was measured using MPa as the unit.

Curing property: 2.5 mL of an adhesive for a friction material in Examples or Comparative Example was dropped onto a dice which was heated to 165° C., and the torque measured using a curelastometer was measured by gelating the adhesive for a friction material under visual observation. Thereafter, the curing property of the adhesive for a friction material was evaluated by setting time required to reach 90% of the torque as a curing completion time using minutes as the unit.

Dimethylphenol modification rate: The dimethylphenol modification rate was calculated by dividing the number of parts by weight of 3,5-dimethylphenol used in the production of a resol phenolic resin by the total value of number of parts by weight of 3,5-dimethylphenol and phenol and multiplying the obtained value by 100 using % as the unit.

The evaluation results relating to the above-described evaluation items are shown in Table 1 below together with the blended compositions of the resol phenolic resins and the adhesives for a friction material.

TABLE 1

| | | Example 1 | Example 2 | Example 3 | Example 4 | Comparative Example 1 |
|---|---|---|---|---|---|---|
| Resol phenolic resin [parts by weight] | Phenol | 100 | 100 | 100 | 100 | 100 |
| | 37% Formalin aqueous solution | 117 | 117 | 117 | 117 | 117 |
| | 30% Ammonia aqueous solution | 4 | 4 | 4 | 4 | 4 |
| | Methanol | 27 | 27 | 27 | 27 | 27 |
| | 3,5-dimethylphenol | 15 | 15 | 5 | 50 | — |
| | Toluene | 15 | 15 | 15 | 15 | 15 |
| | Total | 278 | 278 | 268 | 313 | 263 |
| Adhesive for friction material [parts by weight] | Resol phenolic resin | 278 | 278 | 268 | 313 | 263 |
| | Polyvinyl butyral resin | 29 | 29 | 29 | 29 | 29 |
| | Methanol | 78 | 78 | 78 | 78 | 78 |
| | Toluene | 6 | 6 | 6 | 6 | 6 |
| | Resorcin | — | 3 | — | — | — |
| | Total | 391 | 394 | 381 | 426 | 376 |
| Dimethylphenol modification rate [%] | | 13 | 13 | 4.8 | 33 | — |
| Adhesive strength [MPa] | | 23 | 25 | 23 | 22 | 23 |
| Curing property [minute] | | 5.9 | 5.0 | 7.0 | 5.5 | 9.2 |

All of the adhesives for a friction material in Examples can achieve high adhesive strength within a short adhering time compared to the adhesive for a friction material in Comparative Example 1.

It is apparent that the present invention is not limited to the above embodiment, and may be modified and changed without departing from the scope and spirit of the invention.

This application claims priority based on Japanese Patent Application No. 2015-72169 filed on Mar. 31, 2015, the entirety of the disclosure of which is incorporated herein by reference.

What is claimed is:

1. An adhesive for a friction material comprising:
    a resol phenolic resin for a friction material; and
    a polyvinyl butyral resin,
    wherein resol phenolic resin for a friction material has a structural unit A which is modified by dimethylphenol and is represented by Formula (1) and a structural unit B which is represented by Formula (2);

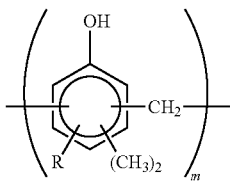
(1)

wherein in Formula (1), m represents an integer of 1 or more; in a case where m is 1, R represents a methylol group; and in a case where m is 2 or more, R's independently represent a hydrogen atom or a methylol group and at least one R is a methylol group; and

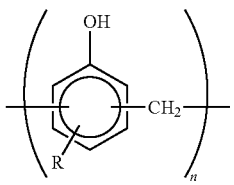
(2)

wherein in Formula (2), n represents an integer of 1 or more; in a case where n is 1, R represents a methylol group; and in a case where n is 2 or more, R's independently represent a hydrogen atom or a methylol group and at least one R is a methylol group and wherein when the ratio of the structural unit A with respect to all structural units having a phenolic hydroxyl group contained in the resol phenolic resin for a friction material is defined as a dimethylphenol modification rate, the dimethylphenol modification rate is greater than or equal to 13% and less than or equal to 50%.

2. The adhesive for a friction material according to claim 1, further comprising resorcin.

3. The adhesive for a friction material according to claim 1, wherein the dimethylphenol is 3,5-dimethylphenol.

4. The adhesive for a friction material according to claim 1, further comprising an organic solvent.

5. The adhesive for a friction material according to claim 4, wherein the organic solvent is one selected from the group consisting of methanol, ethanol, propyl alcohol, ethylene glycol, diethylene glycol, triethylene glycol, and glycerin.

6. The adhesive for a friction material according to claim 4, wherein the organic solvent is toluene or xylene.

7. The adhesive for a friction material according to claim 4, wherein the organic solvent is toluene.

8. A wet friction plate comprising:
    a friction material;
    a metal base material; and
    an adhesive according to claim 6 interposed between the friction material and the metal base material.

* * * * *

UNITED STATES PATENT AND TRADEMARK OFFICE
CERTIFICATE OF CORRECTION

PATENT NO. : 10,259,902 B2
APPLICATION NO. : 15/087232
DATED : April 16, 2019
INVENTOR(S) : Hajime Mifuka et al.

Page 1 of 1

It is certified that error appears in the above-identified patent and that said Letters Patent is hereby corrected as shown below:

On the Title Page

Item (73)
Change:
(73) Assignee: SUMITOMO BAKELITE COMPANY LIMITED, Tokyo (JP)

To be:
(73) Assignee: SUMITOMO BAKELITE COMPANY LIMITED, Tokyo (JP)
   NSK-WARNER K.K., Tokyo (JP)

Signed and Sealed this
Twenty-fourth Day of March, 2020

Andrei Iancu
*Director of the United States Patent and Trademark Office*